Dec. 3, 1929.  T. B. MYERS  1,738,112
MOTOR DRIVEN BEATER
Filed Aug. 5, 1929  2 Sheets-Sheet 1

Inventor:
Thomas B. Myers,
By Bertha L. MacGregor
Atty.

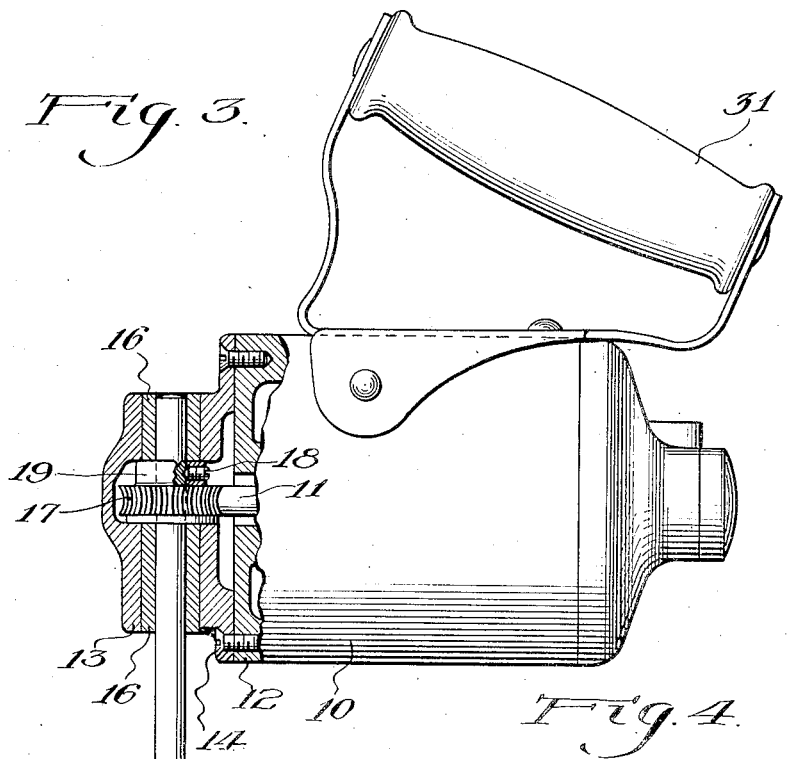
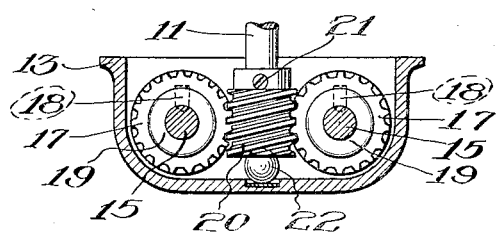
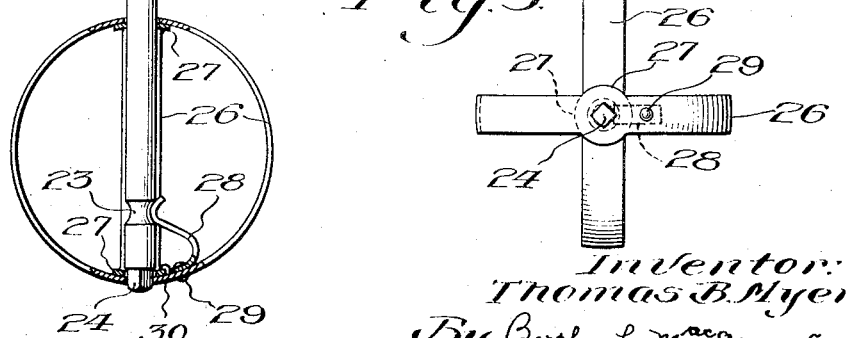

Patented Dec. 3, 1929

REISSUED 1,738,112

UNITED STATES PATENT OFFICE

THOMAS B. MYERS, OF RACINE, WISCONSIN, ASSIGNOR TO HAMILTON BEACH MANUFACTURING COMPANY, OF RACINE, WISCONSIN, A CORPORATION OF WISCONSIN

MOTOR-DRIVEN BEATER

Application filed August 5, 1929. Serial No. 383,623.

This invention relates to motor driven beaters, adapted for beating eggs, whipping cream, mixing batters, and for other purposes.

The invention is embodied in a portable unitary structure which is very compact and well-balanced so that it may be held conveniently by the operator when being used for its intended purpose.

One of the objects of the invention is to provide exceedingly simple and dependable means for driving the beater rods, said means preferably comprising a worm gear on the horizontal motor shaft, meshing with a worm wheel on each of the vertically disposed beater rods. In this manner the beater rods are driven in opposite directions directly from the motor worm gear at a desired speed without the intervention of other gearing and without having one beater rod driven from the other.

The operative connection between the motor shaft and each of the beater rods is such that a motor smaller than that required for other types of drive may be used, and a relatively small gear housing encases all the operative parts.

Another object of the invention is to provide means for facilitating the cleansing of the device without danger of wetting the motor. This is accomplished by providing beater elements which are removably mounted on the lower ends of the rotatable beater rods. These beater elements are securely held in their intended positions on the shafts when in use, but may be readily slipped off the rods when they are required to be cleaned, and the rods, which are not removable, may be easily wiped with a cloth.

In the drawings:—

Figure 3 is a side elevation of the device, partly in section.

Figure 4 is a horizontal sectional view of the gear case taken on the line 4—4 of Figure 1.

Figure 5 is a bottom view of the beating element shown in Figure 3.

Figure 1:
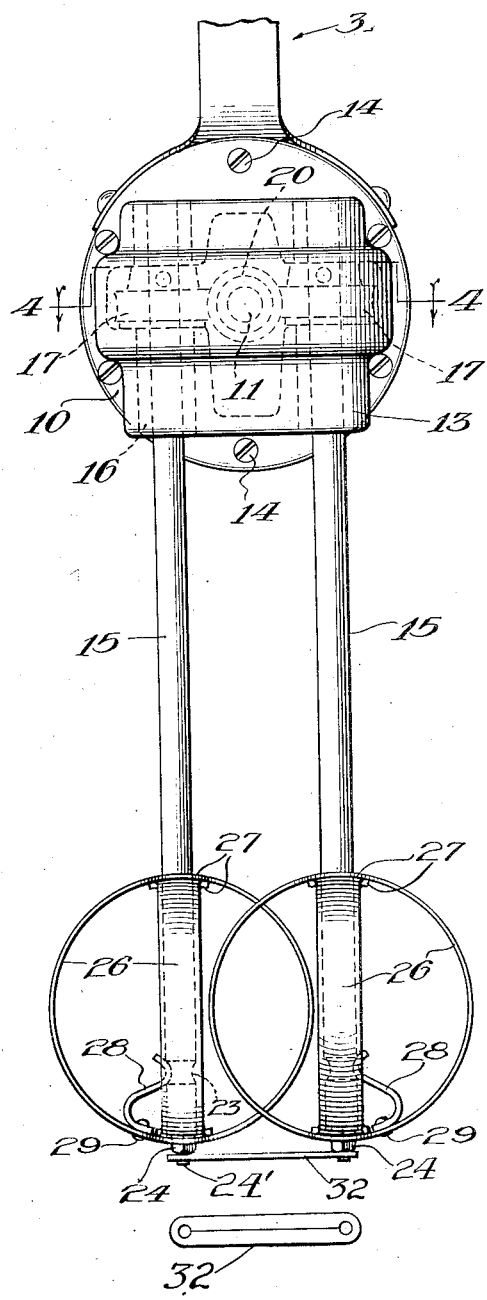
Figure 1 is an end elevation of a beater embodying my invention.

In that embodiment of my invention shown in the drawings, 10 indicates a motor in its housing, with its shaft 11 horizontally disposed and protruding outwardly through a centrally located aperture in the plate 12 of the motor.

A gear casing 13 is secured to the plate member 12 of the motor housing by screws 14. The gear casing 13 is vertically disposed and is relatively narrow so that it takes very little space at the end of the motor against which it fits.

A pair of beater rods 15—15 are rotatably mounted in bearings 16, located in the housing 13. Two of said bearings 16, vertically spaced from each other, are provided for each beater rod 15, and said rods extend downwardly, at right angles to the motor shaft, through apertures in the bottom of the gear case 13.

A worm wheel 17 is fixedly secured to each of the rods 15 by a screw 18 extending through the hub 19 of the worm wheel. The worm wheel 17 and hub 19 occupy the space between the bearings 16 by which each rod 15 is firmly mounted in the gear housing 13. The worm wheels 17 are so spaced that they mesh at opposite sides with a worm gear 20 fixed to the motor shaft 11 by screw 21. 22 indicates a ball thrust bearing between the end of the motor shaft 11 and a gear housing 13.

Figure 2:
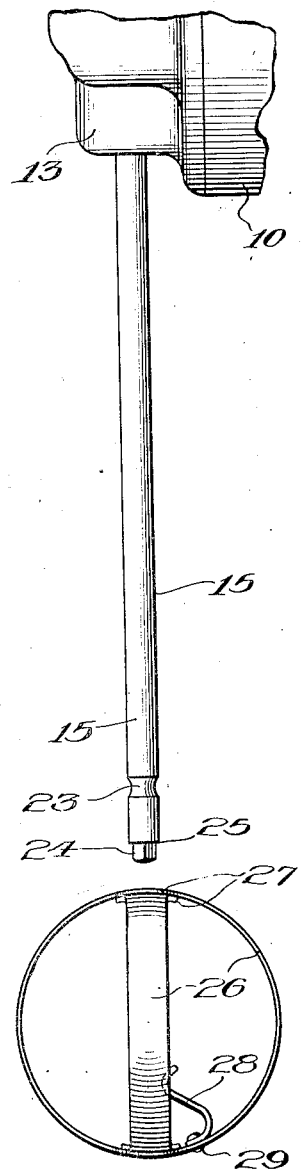
Figure 2 is a fragmentary side elevation of the device showing one of the beater rods and a beating element detached therefrom.

Each of the beater rods 15 is circular in cross section and near its bottom end is provided with a groove 23. Each of the rotatable rods 15 is provided with a square extension 24 at its lower end, whereby a shoulder 25 is formed on the end of the circular part of the rod. In Figures 2, 3, and 5, the rods 15 are shown as terminating with the square end 24, and they are not connected together at their lower ends. For some kinds of work, particularly in mixing heavy batters, it may be desirable to connect the rotatable rods 15 at their lower ends. In Figure 1 I have shown one means for accomplishing this. In said Figure 1 the rotatable rods, just below the square extension 24, are provided with extensions 24', which are circular in cross section. A spring metal connecting bar 32, split and apertured to fit frictionally over the ends 24', is provided for connecting the two rods together at their lower ends. The lower surface of the extension members, 24 or 24', as the case may be, is rounded so that it is adapted to rest in a bowl or other container when in use, and the operator is not required to support the device in her hand.

The beater elements comprise beating rings which may be of the two or four bar type; that is to say, a two bar ring comprises one full ring and a four bar beater ring comprises two full rings welded or otherwise connected together and arranged at right angles to each other. Four bar type rings 26 are shown. These rings are made of relatively narrow thin pieces of metal and are of uniform width except at two opposite points which constitute the top and bottom of the rings when in position on the beater rods. At these places the rings are widened slightly as indicated at 27 to provide the necessary width of metal to be apertured, the aperture at the top being round to fit the rod 15 and at the bottom being square to fit the end 24.

On one or both of the rings 26 a spring 28 is attached as indicated at 29. The beater elements 26 are positioned on the rods 15 by inserting the free end of the rod into the round aperture in the rings and moving the beater rings upwardly on to the rod 15 until the surface 30 engages the shoulder 25 of the rod, and the square end 24 protrudes through the square aperture in the bottom of the ring. The spring 28 will engage the grooved surface 23 and hold the beater rings against vertical displacement on the rod. At the same time the beater rings will be held against circumferential movement on the rod by the square end 24 in the square aperture at the bottom.

A handle 31 is secured to the motor casing.

Obviously, changes in detail of construction may be made without departing from the scope of my invention, and I do not intend to be limited to the precise form shown and described, except as pointed out in the appended claims.

I claim:—

1. A motor driven egg beater comprising a motor having a horizontally disposed shaft, a motor casing, the shaft extending beyond one end of the casing, a gear casing secured to the motor casing and enclosing the end of the motor shaft, beater rods rotatably mounted in the gear casing in operative connection with the motor shaft, said rods depending from said gear casing at right angles to the motor shaft, beater elements on said depending rod ends, and a handle secured to the motor casing.

2. A motor driven beater comprising a motor having its shaft horizontally disposed, a worm gear fixed to the motor shaft, a gear casing secured to the motor, vertically disposed beater rods rotatably mounted in the gear casing and depending therefrom, a worm wheel on each of the beater rods in mesh with the worm gear, and beater elements on the lower ends of the rotatable rods.

3. A motor driven beater comprising a motor having its shaft horizontally disposed, a worm gear fixed to the motor shaft, a gear casing secured to the motor, vertically spaced apart bearings in the gear casing, a pair of vertically disposed beater rods rotatably mounted in said bearings and depending from said gear casing, a worm wheel on each of the beater rods, each worm wheel being located between the vertically spaced bearings, in mesh with the worm gear on the motor shaft at opposite sides thereof, beater elements on the lower ends of said rotatable rods, and a handle secured to the motor.

4. A motor driven beater comprising a motor, a gear casing fixedly secured to the motor, a pair of rotatable rods mounted in the gear casing and depending therefrom, gearing for operatively connecting the rods with the motor shaft, and beater elements quickly detachably mounted on the lower ends of said rotatable rods.

5. A motor driven beater comprising a motor, a gear casing secured to the motor, a pair of rotatable rods mounted in the gear casing and depending therefrom, each rod having a circumferential groove near its lower end, beater elements and means for removably mounting the beater elements on the lower ends of the rotatable rods, said means comprising a spring secured to the beater element and adapted to engage said groove when the beater element is in operative position on the rotatable rod.

6. A motor driven beater comprising a motor, a gear casing secured thereto, a pair of rotatable rods mounted in the gear casing in operative connection with the motor shaft, said rotatable rods each having a circumferential groove near its lower end and a square extension at its end, beater elements apertured for engagement with said beater rod and square end, and a spring secured to the beater element for engagement with said grooved surface when the beater element is in operative position on the rotatable rod.

7. A motor driven beater comprising a motor, a gear casing secured thereto, a pair of beater rods, having squared lower ends, rotatably mounted in the gear casing in operative engagement with the motor shaft, and beater elements removably mounted on said rotatable rods, each of said beater elements comprising a ring having oppositely positioned circular and square apertures for allowing the ring to be positioned on the rod in engagement with the square end thereof.

8. A motor driven egg beater comprising a motor having a horizontally disposed shaft, a motor casing, the shaft extending beyond one end of the casing, a gear casing secured to the motor casing and enclosing the end of the motor shaft, beater rods rotatably mounted in the gear casing in operative connection with the motor shaft, said rods depending from said gear casing at right angles to the motor shaft, beater elements on said depending rod ends, and a handle secured to the motor casing, said beater elements being removably mounted on said rods.

9. A motor driven beater comprising a motor, a gear casing secured to the motor, beater rods rotatably mounted in the gear casing in operative engagement with the motor shaft, and beater elements removably mounted on the lower ends of said beater rods, the beater rods extending below the beater element a slight distance and being rounded on their lower surfaces.

10. A motor driven beater comprising a motor, a gear casing secured to the motor, beater rods rotatably mounted in the gear casing in operative engagement with the motor shaft, and beater elements and a spring metal connecting bar removably mounted on the lower ends of said beater rods, the ends of the rotatable rods extending below the spring bar a slight distance and being curved on their lower surfaces.

In testimony that I claim the foregoing as my invention, I affix my signature, this 30th day of July, 1929.

THOMAS B. MYERS.

DISCLAIMER 1,738,112.—*Thomas B. Myers*, Racine, Wis. MOTOR-DRIVEN BEATER. Patent dated December 3, 1929. Disclaimer filed February 27, 1935, by the assignee, *Hamilton Beach Manufacturing Company*.

Hereby enters the following disclaimer:
The subject matter of claim 4 except when the motor includes a casing and the gear casing is fixedly secured to the motor casing.

[*Official Gazette April 2, 1935.*]